United States Patent [19]

Brand et al.

[11] 4,068,542

[45] Jan. 17, 1978

[54] DRIVE ARRANGEMENT FOR TRANSPORT VEHICLES

[75] Inventors: Werner Brand, Leverkusen; Dieter Schillings, Neuss; Leo Geers, Kaarst; Edmund Pietrowski, Dusseldorf, all of Germany

[73] Assignee: Waggonfabrik Uerdingen A.G., Duesseldorf, Germany

[21] Appl. No.: 731,344

[22] Filed: Oct. 12, 1976

[30] Foreign Application Priority Data

Oct. 14, 1975 Germany ............................ 2545846

[51] Int. Cl.[2] ............................................ F16H 37/00

[52] U.S. Cl. ........................................ 74/625; 74/569

[58] Field of Search ................ 74/625, 496, 498, 504, 74/567, 569; 60/400, 403

[56] References Cited

U.S. PATENT DOCUMENTS

| | | | |
|---|---|---|---|
| 1,864,653 | 6/1932 | Jones | 74/625 X |
| 3,745,469 | 7/1973 | Clark | 74/625 X |

*Primary Examiner*—Edgar W. Geoghegan

*Attorney, Agent, or Firm*—Michael J. Striker

[57] ABSTRACT

A drive arrangement for transport vehicles is operative for moving a step plate between operative positions so that passenger access to the vehicle is facilitated. The drive arrangement includes a turnable shaft coupled to the step plate, and a motor coupled with the shaft for turning the latter about its axis and for moving the step plate between its operative positions. An uncoupling device disengages the motor from the shaft so that the step plate can be manually moved. The drive arrangement also comprises a switching arrangement having first cam parts spaced from and about the shaft, and second cam parts mounted on the shaft for joint rotation therewith. The second cam parts each have a predetermined angular position relative to the shaft and to the first cam parts for controlling the operation of the motor so that manual movement of the shaft upon uncoupling of the motor therewith forceably positions the second cam parts to retain their respective predetermined positions. Thereby, subsequent actuation of the motor is greatly facilitated.

13 Claims, 6 Drawing Figures

FIG. 4
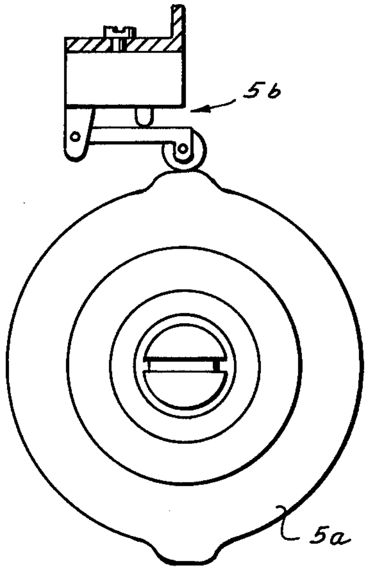
FIG. 5
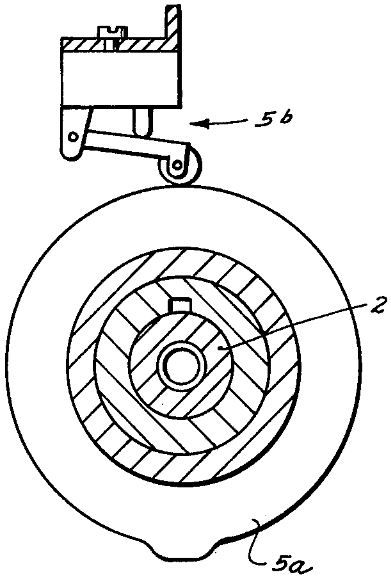
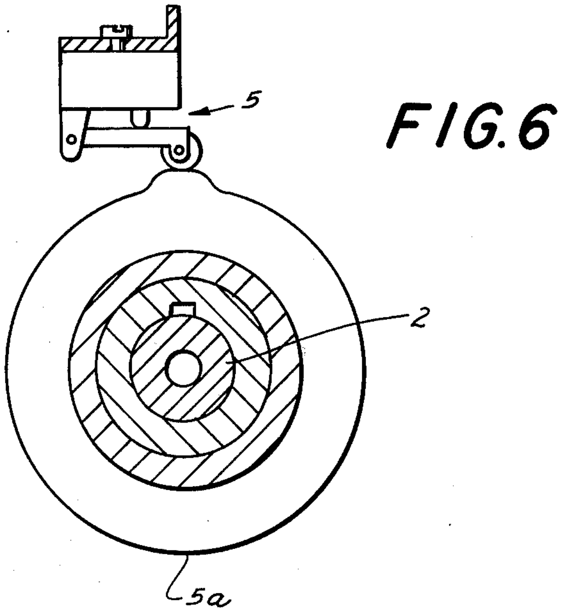
FIG. 6

DRIVE ARRANGEMENT FOR TRANSPORT VEHICLES

BACKGROUND OF THE INVENTION

The present invention relates generally to a drive arrangement and, more particularly, to such an arrangement which is used for driving elements such as movable step plates and/or doors on transport vehicles so as to facilitate passenger access to such vehicles.

It is known in the prior art to provide a drive arrangement for actuating doors which are to turn, fold or pivot relative to the transport vehicle. A motor is employed to operate two crank arms, each of which is connected to a push rod provided with a slip clutch. One push rod is connected to a shaft by means of a link, the other rod is connected with a hollow shaft which surrounds the first-mentioned shaft. Each of these shafts has another link which is in turn connected to another push rod that is connected to a double folding door. Two motor cam switches are provided to actuate the motor on or off.

However, this prior art arrangement is disadvantageous because it does not permit manual operation of the doors. In case of an emergency, the doors can be manually opened only with great difficulty if one succeeds in overcoming the force of the slip clutch. Even so, after such manual manipulation, the cam switch arrangement for controlling the motor will now be out of proper alignment. If one desires to restart the motor, one must reset the cam parts back to their original predetermined position relative to each other. Not only are such prior art arrangements complex in their construction so that the resetting of the cam switch parts is a lengthy time-consuming operation, but also the various mechanical parts of such arrangements are particularly prone to failure due to their increased wear.

SUMMARY OF THE INVENTION

Accordingly, it is the general object of the present invention to overcome the disadvantages of the prior art.

Another object of the present invention is to reliably and directly transmit force from a motor to an element without subjecting the force-transmitting parts to increased wear.

Still another object of the present invention is to move the element between its operative positions either manually or by motorized means.

An additional object of the present invention is to eliminate the maintenance times required for resetting cam switch components.

In keeping with these objects and others which will become apparent hereinafter, one feature of the invention resides, briefly stated, in a drive arrangement, particularly for driving elements such as movable steps and doors on transport vehicles, which comprises a turnable shaft connected to an element to be driven, and a motor coupled with the shaft for turning the latter about its axis and for moving the element between a pair of operative positions. The arrangement also includes a decoupling device for uncoupling the motor from the shaft so that the element can be manually moved between the aforementioned operative positions. A switching arrangement comprises first cam parts spaced from and about the shaft, and second cam parts mounted on the shaft for joint rotation therewith. Each of the second parts has a predetermined angular position relative to the shaft and to the first parts for controlling the operation of the motor. In accordance with the invention, manual movement of the shaft upon uncoupling of the motor therewith forceably positions the second cam parts to attain their respective predetermined positions. Thus, subsequent actuation of the motor is facilitated without requiring a resetting of the cam parts relative to each other.

In order to achieve a compact construction for the drive arrangement, the motor is coupled to the shaft by a drive gear which is mounted on the shaft for free turning movement relative thereto and by a shiftable sleeve member which is also mounted on the shaft but for joint rotation therewith. The sleeve member is provided with a set of teeth which meshes with a cooperating set of teeth provided on the drive gear. The decoupling device is operative for shifting the sleeve member, thereby resulting in the engagement or disengagement of these sets of teeth. It is desirable if one makes the sets of teeth as small as possible in order to be able to arrange the cam parts of the switching arrangement in a compact fashion.

The decoupling device includes a turnable member, and a projecting pin eccentrically mounted thereon. This pin is received in a circumferential groove formed in the sleeve member. The turning of the turnable member may be achieved either manually by hand or with the aid of a cable line that is connected to this turnable member.

The element to be driven is preferably a base or step plate platform and/or a movable door for use in providing passenger access to transport vehicles. Such movable elements are described in the publication "Verkehr und Technik", 1974, vol. 9, page 328.

Such movable step plates are to be moved from a swung-out position in which the plate projects at least in part outwardly beyond the periphery of the vehicle towards a retracted position in which the plate lies within the vehicle periphery for safety reasons.

In order to still further protect persons and property from possible damage during the operation of the movable step plates, a telescoping assembly is provided intermediate the motor and the drive element. This telescoping assembly comprises a pair of sleeves and a spring located intermediate the sleeves. In case a person or object gets trapped in the path of the movable element and thereby obstructs movement of the latter, the length of the telescoping assembly will be increased thus permitting the motor to complete its full cycle and thereupon be shut off. The spring constant of the spring can also be adjusted. It is desirable to set this spring constant to a value which corresponds generally to the weight of a small child.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a side view, partially in section, as seen from the left side of FIG. 1 with the housing removed for clarity;

FIG. 5 is a side view, in partial section of a detail of FIG. 1; and

FIG. 6 is a view analogous to FIG. 5 showing another detail of FIG. 1.

DESCRIPTION OF THE PREFERRED EMBODIMENTS

Figure 1:
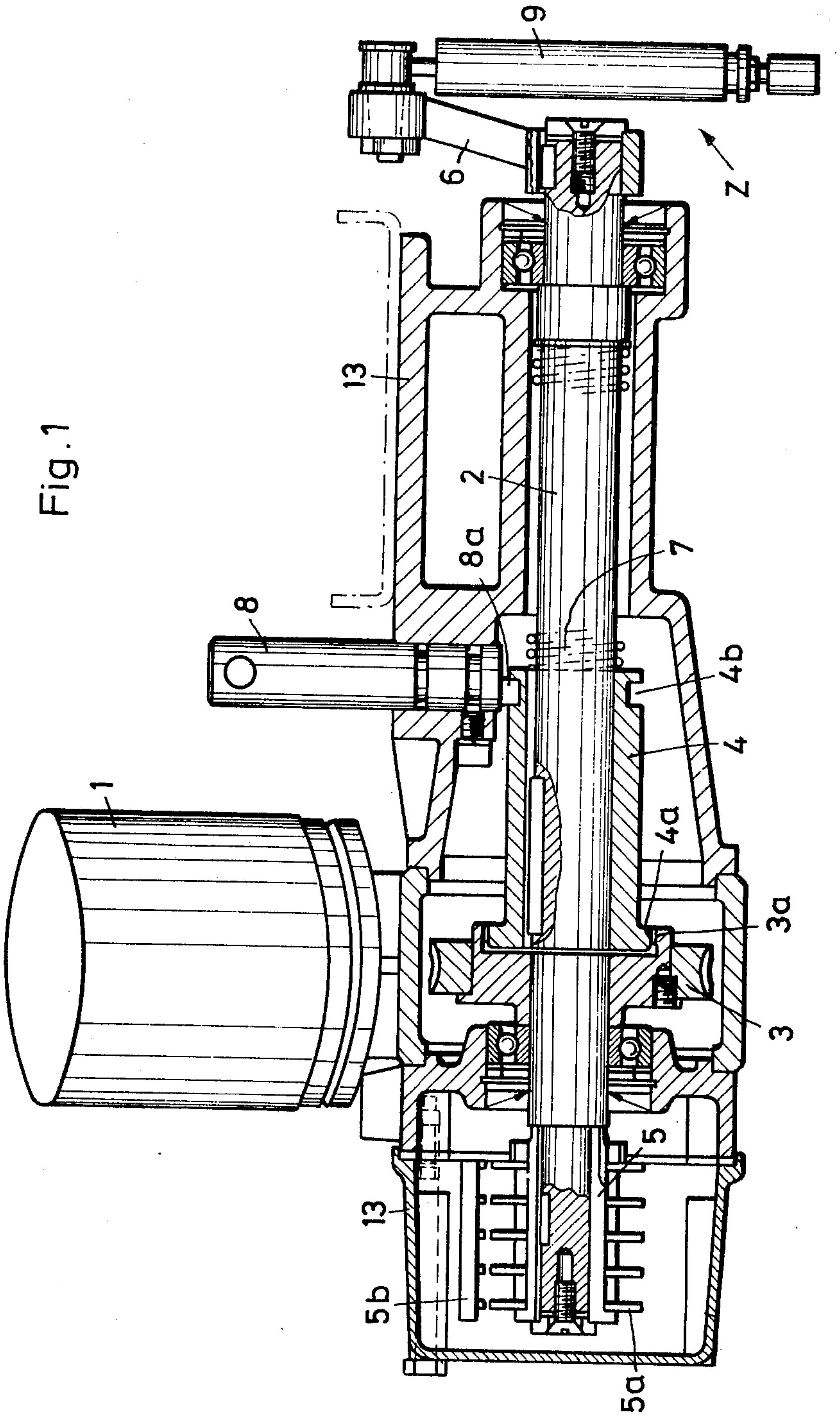
FIG. 1 is a partial view in partial longitudinal section of a drive arrangement in accordance with the present invention.

The drive arrangement illustrated in FIG. 1 comprises a motor 1, preferably an electromotor, which is coupled by a non-illustrated gear with a drive gear 3. Drive gear 3 is mounted about the shaft 2 for free turning movement relative thereto. In order to couple the motor 1 directly to the shaft 2, a shiftable sleeve member 4 is coaxially mounted on the shaft 2 adjacent to the gear 3. The sleeve member 4 is connected directly to the shaft 2 the joint rotation therewith by the illustrated keying arrangement which, in addition, permits the sleeve member 4 to shift axially along the shaft.

Sleeve member 4 has a set of outer gear teeth 4*a* which meshes with a cooperating set of inner gear teeth 3*a* provided on drive gear 3. A return spring 7 normally urges the sets of teeth into meshing engagement with each other so that the turning force generated by the motor 1 can be transmitted to the shaft 2.

The motor 1 can be uncoupled from the shaft 2 by operation of a decoupling device. The decoupling device includes an actuating shaft 8 which is turnable about its axis, and a projecting pin 8*a* which is eccentrically mounted at one end of shaft 8. The pin 8*a* is received in a circumferential groove 4*b* formed about the exterior of the sleeve member 4. By turning the shaft 8 in requisite direction through a predetermined distance, e.g. 90°, the sleeve 4 will be axially shifted with respect to the shaft 2 against the restoring force of spring 7 in direction away from the drive gear 3 until the sets of teeth 3*a*, 4*a* are out of engagement with each other. In this position, the motor 1 is decoupled from the shaft 2, and the shaft can now only be turned manually. By turning the shaft 8 in opposite direction, spring 7 will aid the re-engagement of the sets of teeth 3*a*, 4*a*.

Figure 3:
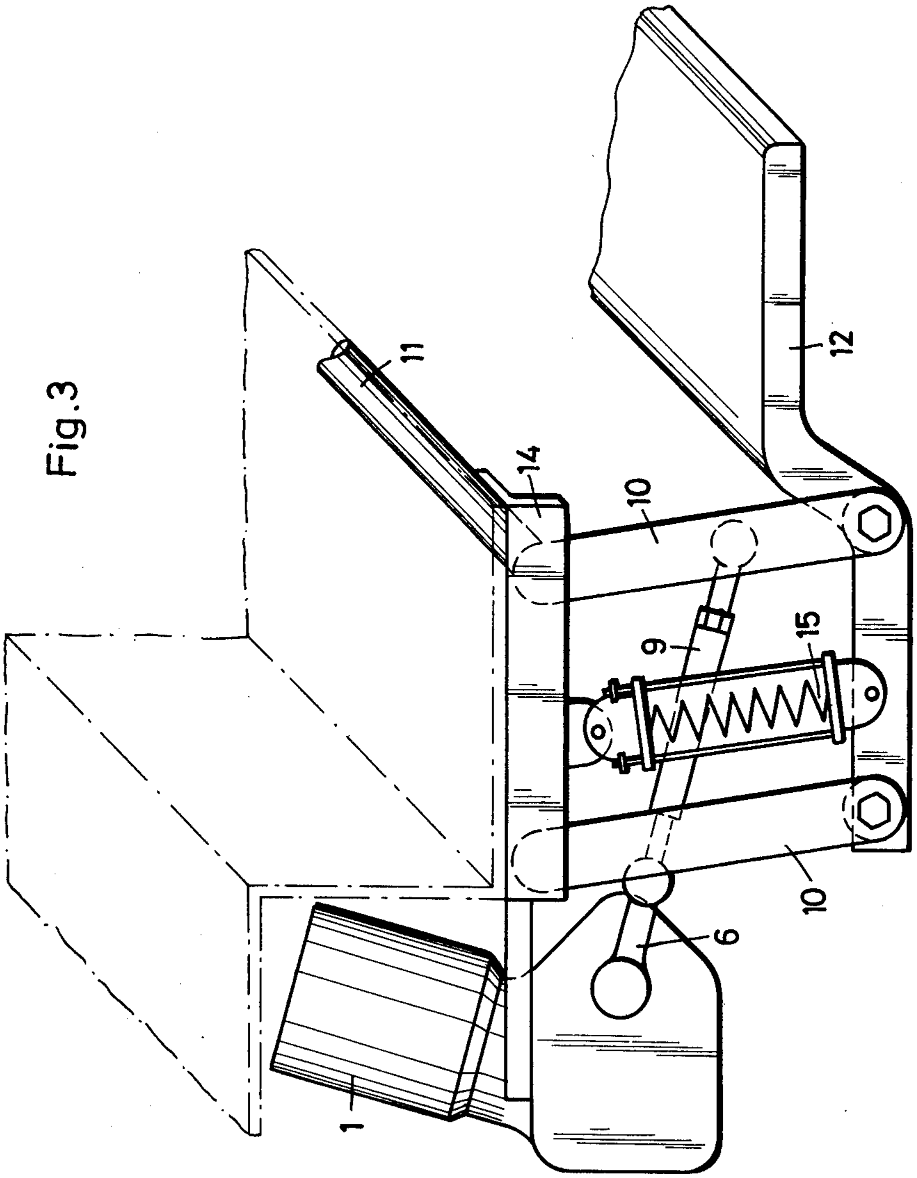
FIG. 3 is a partially diagrammatic, partially perspective view of the arrangement in accordance with the present invention.

A portion of the shaft 2 is coupled to a force-transmitting crank arm 6 which is, in turn, connected to an end of a shock-absorbing member 9. As will be described in greater detail below, the other end of the shock-absorbing member 9 is coupled, as shown in FIG. 3, to the element 12 which is to be driven by the above-described drive arrangement.

Another part of the shaft 2 is connected to a switching arrangement 5. The arrangement 5 comprises first parts 5*b* which are spaced from and about the shaft 2, and second parts 5*a* which are directly mounted on the shaft 2 for joint rotation therewith. As more clearly shown in the enlarged views of FIGS. 4–6, the second parts 5*a* are located such that each has a predetermined angular position relative to the shaft 2 and to the first parts 5*b*. The second parts 5*a* comprise a plurality of cams having radial raised portions distributed in circumferential direction of the cam. The first parts 5*b* comprise a plurality of cam followers and their respectively associated movable armatures. The armatures are in force-transmitting contact with the cam followers and constitute part of an electrical switch assembly. The cam followers roll over the periphery of a respective cam and cause the associated armature to move, in known manner, between positions in which electrical signals for controlling the operation of the motor are generated.

In accordance with the invention, the driven element 12 can either be moved between operative positions by the motor 1 as is customary in normal operation, or the element 12 can be manually moved between these operative positions in case of malfunction. In the event of such an emergency, the motor 1 is initially decoupled from the shaft 2. Thereupon, in this situation wherein manual operation of the element 12 is necessary, manual movemement of the crank arm 6 will cause the shaft 2 to turn and to thereby forceably position the second parts 5*a* to retain their respective predetermined positions relative to the first parts 5*b* by virtue of the fact that both the crank arm 6 and the second parts 5*a* are both directly connected to the shaft 2. When it is desired to subsequently actuate the motor 1, no subsequent alignment of the first and second parts is necessary because these respective parts are already in their proper orientation relative to each other.

Housing 13 is comprised of a plurality of sections which sealingly engage each other. Thus, the housing sections provide a dust- and fluid-tight seal for protecting the switching arrangement 5 and the various force-transmitting elements located in its interior. The housing 13 also is provided with recesses for receiving anti-friction bearings for journalling the shaft 2.

Figure 2:
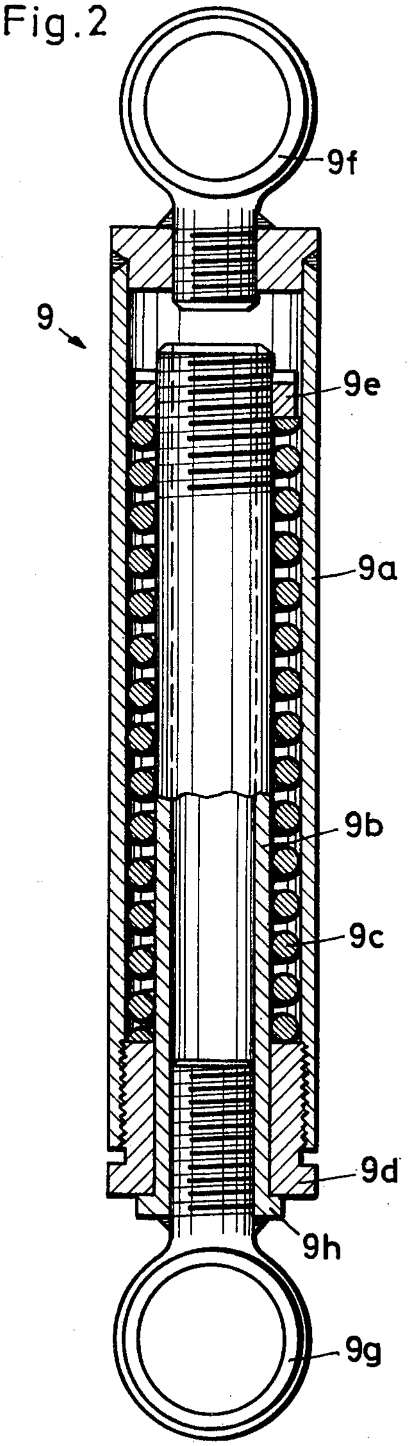
FIG. 2 is a sectional view of a detail of FIG. 1.

Turning now to FIG. 2, the shock-absorbing member 9 is seen to comprise an outer sleeve 9*a* having one end 9*f* adapted to be connected to the crank arm 6. An inner sleeve 9*b* is coaxially arranged within the interior of outer sleeve 9*a* and has a similar end 9*g* at the opposite end of the member 9. Biasing means or spring 9*c* is mounted intermediate the sleeves 9*a*, 9*b*. The upper end of spring 9*a* abuts against a threaded ring member 9*e* which is threaded onto the exteriorly threaded upper end of inner sleeve 9*b*; the lower end of spring 9*a* abuts against an abutment member 9*d* which is threaded onto the interiorly threaded lower end of outer sleeve 9*a*. The inner sleeve 9*b* has a shoulder 9*h* which abuts against abutment member 9*d* so that the two sleeves are firmly mounted in telescoping relationship with each other. By adjusting the position of abutment member 9*d* and/or the position of ring member 9*e*, the total overall length of the shock-absorbing member 9 can be changed as desired, thereby resulting in a corresponding variation of the spring constant of the spring 9*c*.

Turning now to FIG. 3, it will be seen that the drive arrangement of FIG. 1, which is coupled to the arm 6 and thereupon to the shock-absorbing member 9 of FIG. 2, is utilized to move the element 12. The element 12 can be any member which is desired to be moved between a pair of operative positions, but is preferably a base or step plate generally used in transport vehicles for the convenience of passengers desiring to board the vehicle. The stair portion of the vehicle frame is diagrammatically illustrated in FIG. 3 by dot-dashed lines.

Each end of the element 12 is pivotally connected to a shaft 11 mounted on the vehicle frame by means of a pair of mutually parallel links 10 which form a parallelogram-type linkage. The end of shock-absorbing member 9 which faces away from arm 6 is connected to this linkage. Thus, the motor 1, when actuated, or a user without the aid of such motorized means, may move the element 12 from the illustrated position in which the element 12 is located at least in part outwardly of the periphery of the vehicle frame towards a retracted position in which the element 12 lies within the frame periphery. The ease of movement of the element 12 can be further increased if the drive and the links 10 are mounted to a common rigid frame, e.g. to the bracket flange 14. The bracket 14 permits the entire structure to be mounted as a unit onto the vehicle.

A spring assembly 15 is also mounted between bracket 14 and the element 12 so that the greatest spring tension force occurs when the links 10 are moved to a vertical position. The assembly 15 automatically facilitates the manual swinging movement of the element 12 in direction underneath the frame.

As discussed above, no matter whether the element 12 is moved manually or moved by the motor 1, the cams 5*a* of the switching arrangement 5 are always maintained in their aforementioned predetermined angular postions. The first three cams provided on the left side of FIG. 1 are respectively shown in FIGS. 4–6. The cam assembly of FIG. 4 is used for controlling the operation of the motor 1. Thus, this cam assembly is used for switching the motor off everytime the crank arm 6 travels through an arc of 180°. In other words, the motor 1 is automatically switched off whenever the element 12 is in one of its operative positions.

The cam assembly of FIG. 5 is used for safety reasons and serves for keeping the transport vehicle stopped when the element 12 is in the illustrated exposed position of FIG. 3, and for permitting the transport vehicle to start again only when the element 12 has been retracted.

The cam assembly of FIG. 6 is also used for reasons of safety and serves for keeping the doors of the transport vehicle closed when the element is in the retracted position, and for permitting the doors to be opened only after the element has been moved to the exposed position of FIG. 3.

The remaining cams can be used for other motor control purposes, for example for controlling the speed and torque characteristics of the motor. Such additional motor control devices are entirely conventional in the art and are not believed to require any extended discussion.

It will be understood that each of the elements described above, or two or more together, may also find a useful application in other types of constructions differing from the types described above.

While the invention has been illustrated and described as embodied in a drive arrangement for transport vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A drive arrangement, particularly for driving elements such as movable steps and doors on vehicles, comprising a driven element manually movable between operative positions; motorized means for moving said element, including a turnable shaft coupled to said element, and a motor coupled with said shaft for turning the latter about its axis and for moving said element between said operative positions; means for uncoupling said motor from said shaft so that said element can be manually moved; and switching means having first parts spaced from and about said shaft and second parts mounted on said shaft for joint rotation therewith and having respective angular orientations relative to said shaft, said second parts each being turnable with said shaft to and from a control position relative to said first parts, in which control positions said second parts cooperate with said first parts for controlling the operation of said motor so that manual movement of said shaft upon uncoupling of said motor therefrom enforces movement of said second parts to said control positions, whereby subsequent actuation of said motor is facilitated.

2. An arrangement as defined in claim 1, wherein said motorized means further comprises a drive gear coupled to said motor and mounted about said shaft for free turning movement relative thereto.

3. An arrangement as defined in claim 2, wherein said motorized means further comprises a shiftable member also mounted on said shaft for joint rotation therewith, and wherein said uncoupling means includes means for displacing said shiftable member in axial direction of said shaft towards and away from said drive gear.

4. An arrangement as defined in claim 3, wherein said shiftable member has a first set of gear teeth, and wherein said drive gear has a second set of gear teeth which meshes with said first set when said displacing means moves said shiftable member axially adjacent said drive gear.

5. An arrangement as defined in claim 3, wherein said shiftable member has a circumferential groove, and wherein said displacing means comprises an actuating member and a projection eccentrically mounted thereon, said projection being received in said groove and being operative for displacing said shiftable member when said actuating member is actuated.

6. An arrangement as defined in claim 3, and wherein said uncoupling means further comprises biasing means for normally urging said shiftable member in axial direction towards said drive gear.

7. An arrangement as defined in claim 1; and further comprising a crank arm located intermediate said shaft and said driven element for moving the latter between said operative positions.

8. An arrangement as defined in claim 7; and further comprising a shock-absorbing member coupled intermediate said crank arm and said driven element for moving the latter between said operative positions.

9. An arrangement as defined in claim 8, wherein said shock-absorbing member comprises a pair of sleeves coaxially arranged in telescoping relationship relative to each other, and biasing means intermediate said sleeves and operative for retarding relative movement of said sleeves in axial direction away from each other.

10. An arrangement as defined in claim 9, wherein said biasing means is a spring having spaced ends; and further comprising adjustable means for changing the spring constant of the spring, including a pair of abutment members mounted on each of said sleeves for movement relative thereto, each abutment member having a surface facing a respective end of said spring.

11. An arrangement as defined in claim 1; and further comprising a frame having a periphery, said driven element being mounted on said frame for movement between an exposed position in which said element projects at least in part beyond the periphery of said frame, and a retracted position in which said element lies within said frame periphery.

12. An arrangement as defined in claim 11, wherein said driven element is configurated as a step plate having spaced ends; and further comprising a pair of substantially parallel link members connected to said frame at each of said spaced ends of said plate, said link members pivotally connecting said plate to said frame.

13. An arrangement as defined in claim 1, wherein each of said first parts of said switching means comprises a cam follower and a switch armature in force-transmitting relationship with the latter, and wherein each of said second parts of said switching means comprises a cam for actuating said switch armature.

* * * * *